US007017989B2

(12) United States Patent
Yamaguchi et al.

(10) Patent No.: US 7,017,989 B2
(45) Date of Patent: Mar. 28, 2006

(54) VEHICULAR SEAT INCLUDING FORWARD MOVABLE HEADREST

(75) Inventors: Hiroyoshi Yamaguchi, Yokohama (JP); Yuji Niikura, Yokohama (JP); Takeshi Itoh, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 261 days.

(21) Appl. No.: 10/620,891

(22) Filed: Jul. 16, 2003

(65) Prior Publication Data

US 2004/0012234 A1    Jan. 22, 2004

(30) Foreign Application Priority Data

Jul. 18, 2002    (JP)    ............... 2002-209700

(51) Int. Cl.
*B60N 2/42*    (2006.01)
(52) U.S. Cl. ................................. 297/216.12
(58) Field of Classification Search ........... 297/216.12, 297/216.14, 408
See application file for complete search history.

(56) References Cited

U.S. PATENT DOCUMENTS

| 5,927,804 | A | * | 7/1999 | Cuevas | ............... | 297/216.12 |
| 6,019,424 | A | * | 2/2000 | Ruckert et al. | ........ | 297/216.12 |
| 6,024,406 | A | * | 2/2000 | Charras et al. | ........ | 297/216.14 |
| 6,199,947 | B1 | * | 3/2001 | Wiklund | ............... | 297/216.12 |
| 6,655,733 | B1 | * | 12/2003 | Humer et al. | .......... | 297/216.12 |
| 2002/0195846 | A1 | | 12/2002 | Masuda et al. | ........ | 297/216.12 |

FOREIGN PATENT DOCUMENTS

| DE | 199 24 236 C1 | 10/2000 |
| DE | 299 15719 U1 | 2/2001 |
| DE | 10150899.9 | * 10/2001 |
| EP | 0 627 340 A1 | 12/1994 |
| EP | 1 077 155 A1 | 2/2001 |
| GB | 1 483 567 | 8/1977 |
| JP | 2000-118280 | 4/2000 |
| JP | 2003-80985 | 3/2003 |

OTHER PUBLICATIONS

EP Search Report dated Oct. 22, 2003 from EP 03015628.5.

* cited by examiner

*Primary Examiner*—Peter R. Brown
(74) *Attorney, Agent, or Firm*—Ohlandt, Greeley, Ruggiero & Perle LLP.

(57) ABSTRACT

A vehicular seat includes at an upper part of a seat back an upper frame which extends in a widthwise direction of the seat back. An actuator unit which generates a drive force is attached along the upper frame. A headrest support frame is provided to the upper frame so as to be capable of moving in a front-and-back direction. When an acceleration equal to or above a predetermined value is applied to a vehicle by a collision from behind, a drive force generated by an operation of the actuator unit is transmitted to the headrest support frame. By moving the headrest support frame in a direction along which it approaches an occupant by using this drive force, a headrest supported to the headrest support frame moves frontward.

11 Claims, 5 Drawing Sheets

VEHICULAR SEAT INCLUDING FORWARD MOVABLE HEADREST

CROSS-REFERENCE TO RELATED APPLICATIONS

This application is based upon and claims the benefit of priority from the prior Japanese Patent Application No. 2002-209700, filed Jul. 18, 2002, the entire contents of which are incorporated herein by reference.

BACKGROUND OF THE INVENTION

1. Field of the Invention

The present invention relates to a vehicular seat including a forward movable headrest that a headrest moves forward so as to support a head of an occupant when a shock is given to a vehicle.

2. Description of the Related Art

In order to improve the safety of an occupant at the time of a collision from behind, there has been proposed a vehicular seat that a headrest moves forward and supports a head of a seated occupant from a rear side when a shock is given to a vehicle. As disclosed in Jpn. Pat. Appln. KOKAI Publication No. 2000-118280, this type of seat includes a headrest which can move to a front side of a seatback, a shock plate included in a seat back in order to move this headrest forward, and others. When an occupant sitting in a seat is pressed against the shock plate due to application of a shock to a vehicle, the headrest moves forward and a head of the occupant is supported from the rear side.

Like the prior art, since a structure that the headrest is moved forward by utilizing a behavior of an occupant varies depending on physical conditions such as a weight of an occupant or traveling conditions such as a vehicle speed, there is fear that its function cannot be fully demonstrated.

In order to cope with this problem, in a seat apparatus disclosed in Jpn. Pat. Appln. KOKAI Publication No. 2003-80985, the headrest is moved forward by a drive force generated by an actuator. This seat apparatus instantaneously moves the headrest forward by the drive force generated by the actuator when a predetermined shock is applied to the vehicle.

In case of incorporating the actuator to the seatback, consideration must be given so as not to deteriorate the comfortableness of the seat. In the seat apparatus disclosed in Jpn. Pat. Appln. KOKAI Publication No. 2003-80985, a headrest support frame which can move forward is contained at an upper part of the seat back. The headrest can be supported by this headrest support frame. In a main frame constituting the seat back, an actuator is set at a lower part on an inner surface of a side frame portion on one side. A drive force generated by the actuator is transmitted to the headrest support frame.

The headrest support frame of this seat apparatus is arranged in a dead space (portion which is not brought into contact with the back of an occupant) at the seat back upper part. The actuator is arranged in the dead space along a side frame portion which does not come into contact with the back of an occupant. This seat apparatus requires a transmission mechanism used to transmit a drive force generated by the actuator to the headrest support frame. This transmission mechanism is assembled into a side part of the seat back so as not to deteriorate the comfortableness of the seat.

The actuator is set at a position considerably apart from the headrest support frame. Further, the transmission mechanism also requires conversion of the drive force from the actuator into a force in a movement direction of the headrest. Therefore, this type of transmission mechanism tends to have a large size. Furthermore, the dead space on the seat back side part is a limited narrow area. Therefore, when the relatively large transmission mechanism is set in the dead space, this can be a factor of the uncomfortable feeling when sitting in the seat back.

Further, a long component extending from the actuator to the headrest support frame is used for the transmission mechanism. Such a long component bends upon receiving the drive force from the actuator at the time of a collision of a vehicle, and this can be a factor which delays forward movement of the headrest. Moreover, when such a long component is deformed, it can be considered that a quantity of forward movement of the headrest is decreased. In order to solve this problem, when the rigidity is increased by using a reinforcing member or enlarging a cross section, the transmission mechanism is further increased in size.

BRIEF SUMMARY OF THE INVENTION

The present invention provides a vehicular seat having a forward movable headrest which can achieve both the excellent comfortableness to sit in and the good operability.

According to the present invention, there is provided a vehicular seat comprising:

a main frame which is provided to a seat back which supports a back of an occupant who sits in, and the main frame having an upper frame which is positioned at an upper part of the seat back and extends in a widthwise direction of the seat back and a pair of side frames which extend downwards from both ends of the upper frame;

a headrest support frame which is arranged at an upper part of the main frame and can move from a first position in the vicinity of the upper frame to a second position in the vicinity of the occupant;

a headrest which is attached to the headrest support frame and opposed to a head of the occupant; and an actuator unit which is attached along the upper frame, generates a drive force when an impulse force equal to or above a predetermined value is applied to a vehicle, and moves the headrest support frame toward the second position by transmitting the drive force to the headrest support frame.

According to this structure, the actuator unit is set along an upper frame which does not come into contact with a back of the occupant. This actuator unit moves the headrest support frame in the vicinity of the upper frame from the first position to the second position. Therefore, a transmission mechanism used to transmit the drive force of the actuator unit to the headrest support frame is simplified, and it can be constituted to be compact. Since this actuator unit is accommodated in a dead space at the seat back upper part, the uncomfortable feeling is not produced when sitting in. Since this actuator unit is arranged in the vicinity of the headrest support frame to be driven, a delay of an operation or a decrease in movement quantity of the headrest can be suppressed.

The actuator unit is arranged in the dead space at the lower part in an intermediate portion of the upper frame in the widthwise direction in such a manner that its drive force can be applied to a substantially central part of the headrest support frame in the widthwise direction, for example.

Preferably, the headrest support frame has an upper portion arranged on a front side of the upper frame in substantially parallel to the upper frame, and the actuator unit has: a piston which moves in a direction along the upper frame;

a cam member which can enter between the upper frame and the upper portion of the headrest support frame; a transmission mechanism which transmits movement of the piston to the cam member and pushes out the headrest support frame toward the second position by causing the cam member to enter between the upper frame and the upper portion of the headrest support frame; and a stopper which is provided to the main frame and receives the headrest support frame when the headrest support frame is moved to the second position. With this structure, the headrest can be moved to the second position by the simple transmission structure using the cam member.

Preferably, the cam member has: a slope portion which thrusts out the headrest support frame toward the second position in process of entering of the cam member into a gap between the upper frame and the upper portion of the headrest support frame; and a flat portion which holds the headrest support frame with the stopper upon completion of entering of the cam member into a gap between the upper frame and the upper portion of the headrest support frame. According to this structure, with the simple structure using the stopper which receive the headrest support frame and the flat portion of the cam member, the headrest can be held at the second position.

Preferably, the transmission mechanism comprises a link which is supported to the upper frame so as to be capable of swiveling and has a wall which moves along a gap between the upper frame and the headrest support frame by the piston, and the cam member provided to the wall.

Preferably, it may further comprise a return spring which presses the headrest support frame toward the first position.

An example of the headrest support frame has an upper portion which is arranged along the upper frame and extends in a horizontal direction, and a pair of side portions which extend downward along the side frame from both ends of the upper portion and are supported to the side frame so as to be capable of swiveling in a front-and-back direction.

Another example of the headrest support frame has an upper portion which is arranged along the upper frame and extends in a horizontal direction, and a pair of brackets which extend downward along the side frame from both ends of the upper portion and each of which consists of a plate member supported to the side frame so as to be capable of swiveling in a front-and-back direction.

In this preferred mode according to the present invention, the apparatus further comprises a deceleration mechanism which decelerates a moving speed when the headrest support frame moves from the first position toward the second position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment according to the present invention will now be described hereinafter with reference to FIGS. 1 to 3B.

Figure 1:
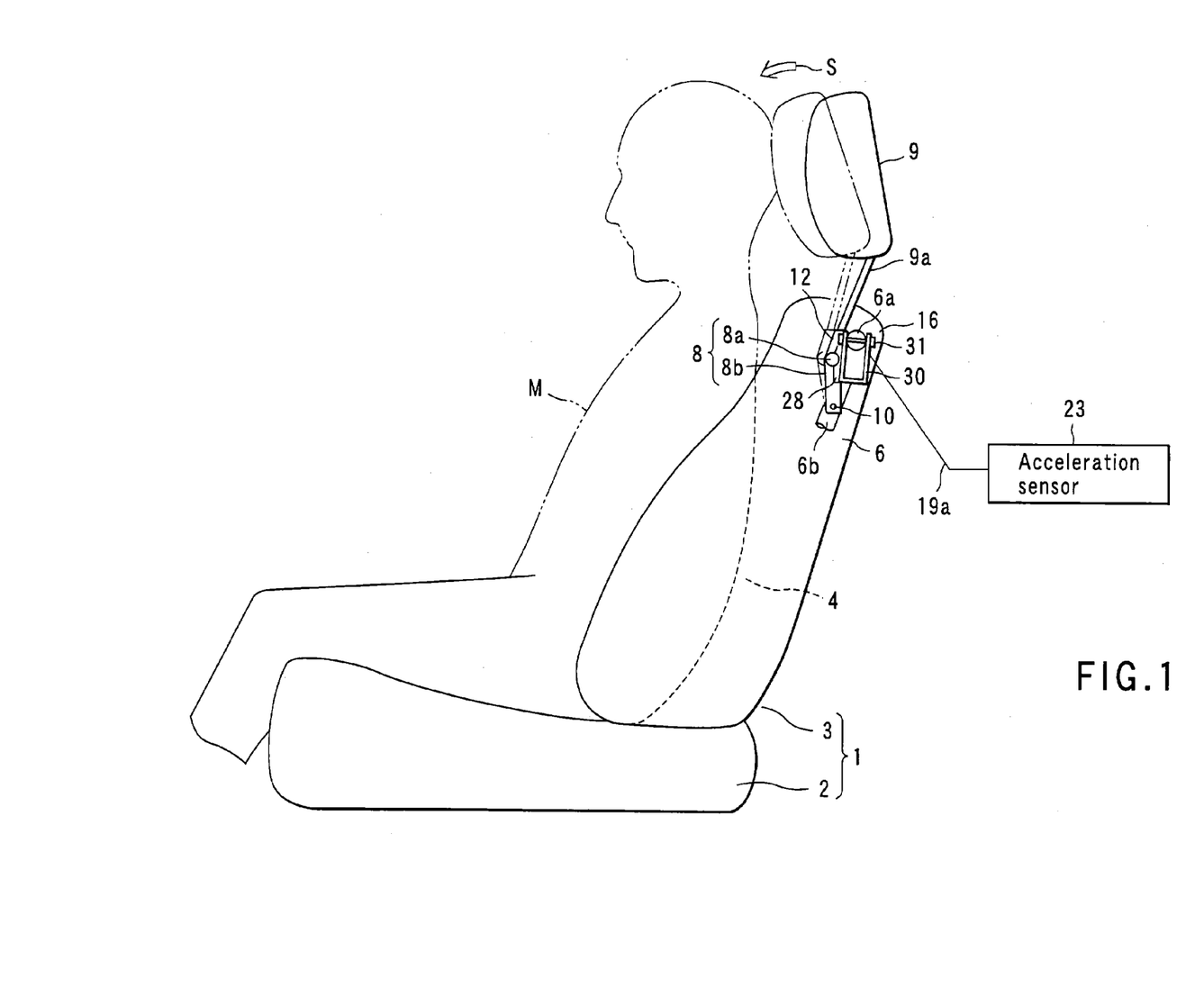
FIG. 1 is a side view of a vehicular seat according to a first embodiment of the present invention.

FIG. 1 shows a vehicular seat 1 of a driver's seat which an occupant M of an automobile sits in. This vehicular seat 1 comprises a seat cushion 2 which supports a bottom of the occupant M, and a seat back 3 which can be raised through a reclining device (not shown) at a rear part of the seat cushion 2.

Figure 2:
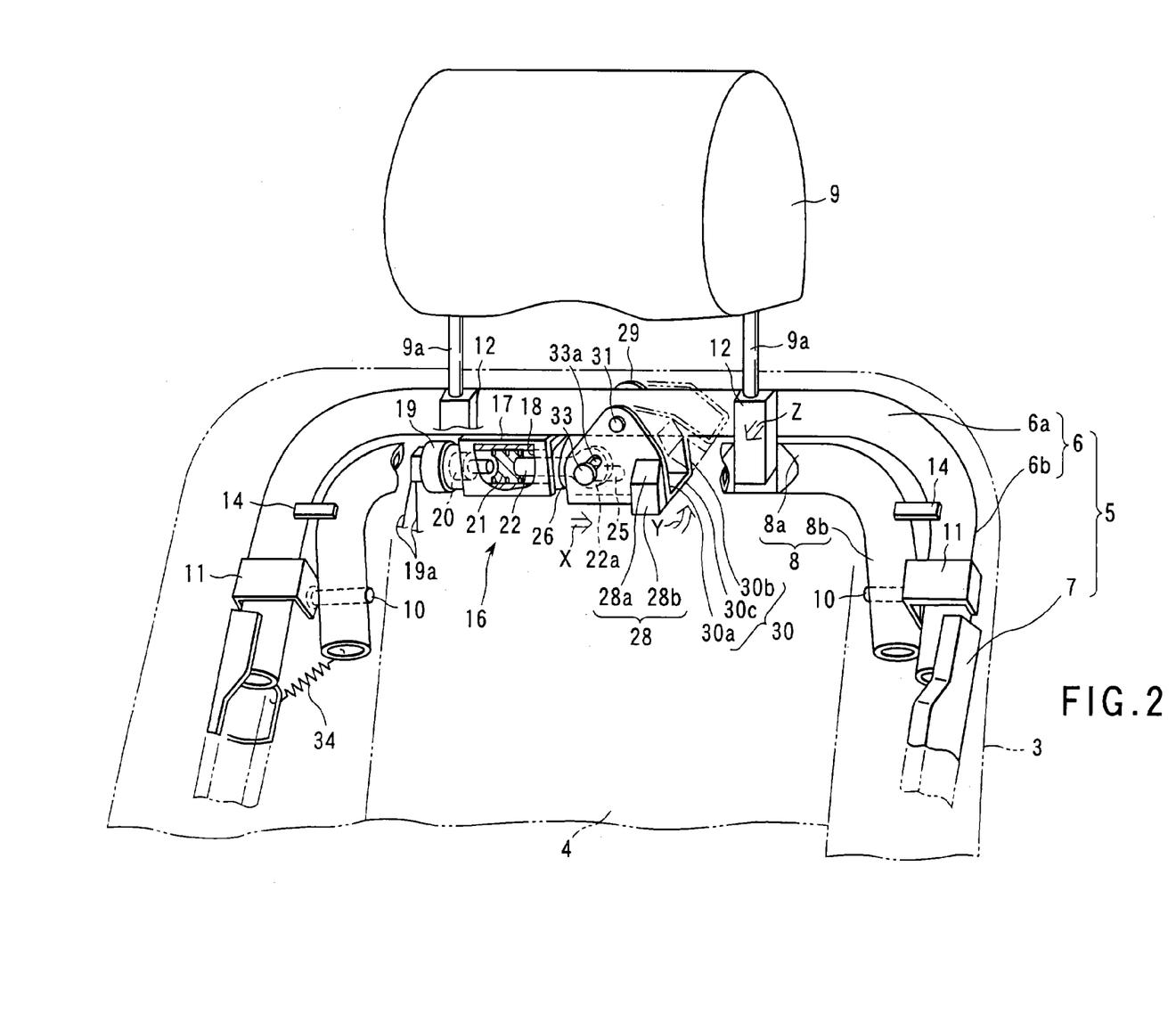
FIG. 2 is a perspective view showing an upper part of the seat depicted in FIG. 1.

The seat back 3 has a support portion 4 which supports a back of the occupant M. An upper part of the support portion 4 extends to the vicinity of a shoulder of the seated occupant M. A main frame 5 is included in an inner part of the seat back 3. As shown in FIG. 2, the main frame 5 includes an upper frame 6 arranged at an upper part of the seat back 3, and a pair of right and left side frames 7 arranged at both side parts of the seat back 3. The upper frame 6 consists of a pipe member which is bent into a substantially inverted-U-like shape.

The upper frame 6 has an upper section 6a along a widthwise direction (lateral direction) of the seat back 3, and a pair of right and left side sections 6b which extend downward from both ends of this upper section 6a. The side frames 7 have cross sections like ⊏, and are connected to the both ends of the upper frame 6. One end of the side frames 7 is coupled with a main frame (not shown) of the seat cushion 2 through the reclining device.

As shown in FIG. 2, a movable headrest support frame 8 is provided to the upper part of the main frame 5 of the seat back 3. A headrest 9 is attached to the headrest support frame 8. As shown in FIG. 1, the headrest support frame 8 is arranged in the vicinity of the upper section 6a extending in the horizontal direction.

An example of the headrest support frame 8 is formed of a pipe member as a frame material. This pipe member has an upper portion 8a, and a pair of right and left side portions 8b each of which is formed into a substantially inverted-U-like shape. The side portions 8b extend downward from the both ends of the upper portion 8a.

The upper portion 8a is arranged on the front side of the upper section 6a of the upper frame 6 so as to be substantially parallel to the upper section 6a. As shown in FIG. 2, the headrest support frame 8 has such a size as that it can be accommodated in a pair of the right and left side sections 6b of the upper frame 6.

Each of a pair of the side portions 8b is supported to the side sections 6b of the upper frame 6 by a pin member 10 so as to be capable of swiveling in a front-and-back direction. The pin member 10 is provided to each side section 6b of the upper frame 6 and protrudes toward the inside of the upper frame 6. The headrest support frame 8 can swivel from a first position (standby position) close to the upper frame 6 toward a second position (forward position) close to the front side, i.e., the occupant M with each pin member 10 being used as a supporting point.

Each pin member 10 is attached to a U-shaped support 11 disposed to the side section 6b. As shown in FIG. 2, a pair of right and left cylindrical holding members 12 are fixed to the upper portion 8a. A pair of headrest stays 9a protruding from the lower part of the headrest 9 are inserted into these holding members 12 detachably and movably in the vertical direction. Moving up and down the headrest 9 can adjust a height of the headrest 9 in accordance with the head of the occupant M.

A stopper 14 is attached to the upper part of each side section 6b of the upper frame 6. These stoppers 14 restrict the headrest support frame 8 from moving forward beyond the second position. Since each stopper 14 protrudes toward the inside of the side section 6b, a substantially upper part of each side section 6b of the headrest support frame 8 can be received. With the stoppers 14, the headrest 9 can stop at the second position where the head of the occupant M is supported.

As shown in FIG. 2, for example, a gunpowder type actuator unit 16 is attached to the upper frame 6. The actuator unit 16 is arranged along an intermediate portion of the upper section 6a in the longitudinal direction. This actuator unit 16 has an actuator main body 17 which extends along the upper section 6a. The actuator main body 17 is fixed to the lower part of the upper section 6a close to the center thereof in substantially parallel to the upper section 6a. A cylinder 18 is formed in the actuator main body 17 along the upper section 6a.

The cylinder 18 is formed on the substantially entire actuator main body 17. To this cylinder 18 are assembled an ignition portion 19, a gas generation portion 20 having a gunpowder, a piston 21, a piston rod 22 (corresponding to the piston) having a through hole 22a at an end thereof and others from the left side in FIG. 2 as an example of means for instantaneously generating a drive force.

An acceleration sensor 23 (shown in FIG. 1) which detects an impact shock applied to a vehicle body (not shown) in a front-and-back direction is connected to the ignition portion 19 through a signal harness 19a. When a signal from this sensor 23 is inputted to the ignition portion 19, the gas generation portion 20 is ignited and the gunpowder burns. As a result, the piston rod 22 instantaneously moves along the upper section 6a.

That is, the gas is instantaneously generated by the operation of the gas generation portion 20. With a pressure of this gas, the piston rod 22 instantaneously moves to the right side in FIG. 2 through the piston 21. A cylindrical guide member 26 extends from the right end portion of the actuator main body 17 along the upper section 6a. A pair of slots 25 along the upper section 6a are formed on both sides of the guide member 26 in the diametric direction.

A cam member 28 and a transmission mechanism 29 used to transmit a propulsion power of the piston rod 22 to the headrest support frame 8 are provided around the guide member 26. The transmission mechanism 29 has a function to transmit movement of the piston rod 22 in an axial direction to the cam member 28. The cam member 28 can enter a gap between the upper section 6a and the upper portion 8a. When the cam member 28 enters a gap between the upper section 6a and the upper portion 8a, the upper portion 8a is pushed forward.

As shown in FIG. 2, the cam member 28 is attached to a link 30 of the transmission mechanism 29. The transmission mechanism 29 has the link 30 (corresponding to a swiveling member) consisting of, e.g., a sheet-metal member. The link 30 has a front wall 30a positioned on the front side of the guide member 26, a rear wall 30b positioned on the rear side of the guide member 26, and a lower wall 30c positioned below the guide member 26.

Each of the front wall 30a and the rear wall 30b is formed into a shape close to, e.g., a triangle as seen from the front side. The substantially upper parts of the front wall 30a and the rear wall 30b are supported on both sides of the upper section 6a directly above the guide member 26 by a pin member 31 which functions as a hinge portion so as to be capable of swiveling. The pin member 31 is inserted in a diametric direction of the upper section 6a.

The front wall 30a and the rear wall 30b of the link 30 extend to the lower side of the guide member 26. The lower wall 30c is distantly positioned below the guide member 26. The link 30 can swivel around the pin member 31 in the counterclockwise direction from a posture indicated by solid lines in FIG. 2, i.e., a posture that the lower wall 30a becomes substantially horizontal. When the front wall 30a of the link 30 moves up while swiveling around the pin member 31, the front wall 30a enters a gap between the upper section 6a and the upper portion 8a.

A pin member 33 is inserted into a through hole 22a formed at the end of the piston rod 22 and the slots 25 formed to the guide member 26. This pin member 33 passes through slots 33a formed to the front wall 30a and the rear wall 30b. The movement of the piston rod 22 is transmitted to the link 30 by the pin member 33. The slots 33a extend in an oblique direction toward the pin member 31 which supports the link 30. The slots 25 of the guide member 26 extend in the horizontal direction.

Figure 3A:
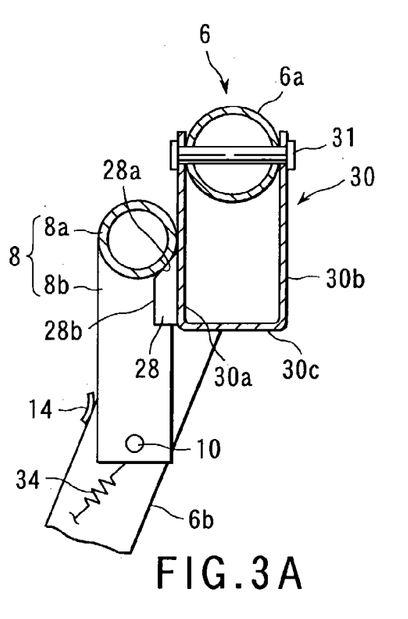
FIG. 3A is a vertical cross-sectional view showing a headrest support frame, a transmission mechanism and the like of the seat depicted in FIG. 1.
Figure 3B:
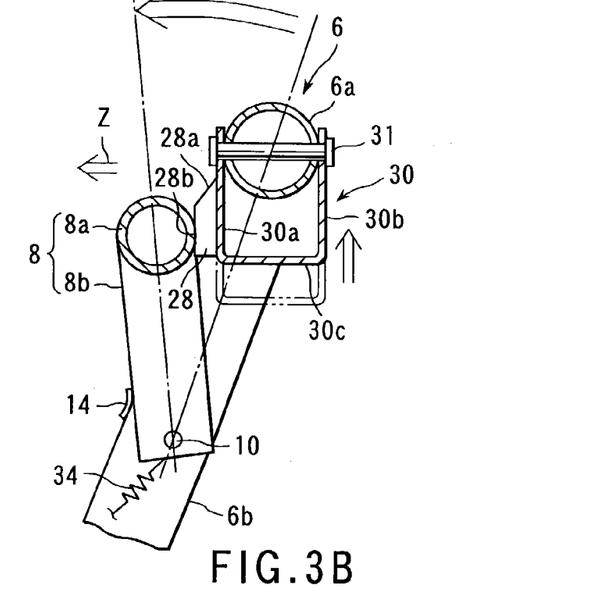
FIG. 3B is a vertical cross-sectional view showing a state that the headrest support frame illustrated in FIG. 3A is moved forward.

When the piston rod 22 moves in the right direction in FIG. 2, the link 30 swivels with the pin member 31 being used as a supporting point by the cooperation of the slots 33a and 25 as indicated by chain double-dashed lines in FIG. 2 and solid lines in FIG. 3B. The cam member 28 is attached on a surface of the front wall 30a opposed to the upper portion 8a.

The cam member 28 is provided at a position where it can enter a gap between the upper section 6a and the upper portion 8a when the link 30 moves up while swiveling. This cam member 28 has a zonal shape which extends in a direction that the link 30 swivels. As shown in FIGS. 2, 3A and 3B, a slope portion 28a which extends downward to the front side of the upper frame 6 and a flat portion 28b along the front wall 30a are formed on the front surface of the cam member 28. The flat portion 28b is continuously formed to the slope portion 28a.

A thickness of the cam member 28 is slightly larger than a distance between the upper section 6a and the upper portion 8a formed when the upper portion 8a abuts on the stopper 14. Therefore, when the link 30 moves up while swiveling, the upper portion 8a is pushed out to the second position by the slope portion 28a.

When the link 30 moves up to a final position shown in FIG. 3B while swiveling, the upper portion 8a sandwiched between the flat portion 28b and the stopper 14, thereby locking the upper portion 8a. That is, after the headrest 9 is moved to the second position by the slope portion 28a of the cam member 28, the headrest 9 is held at the second position by the flat portion 28b.

As an example of the return spring, tension coil spring 34 is connected to the headrest support frame 8. One end of the tension coil spring 34 is connected to the lower end portion of the side portion 8b. The other end of the tension coil spring 34 is connected to the side section 6b. The headrest support frame 8 is urged toward the first position (standby position) by an elastic force of the tension coil spring 34.

A buffer member (not shown) such as rubber is provided on a rear surface of the holding member 12. The upper portion 8a which is urged by the spring 34 abuts on the upper section 6a through this buffer member. This headrest 9 is usually held at the first position indicated by the solid lines in FIG. 1.

An effect of the vehicular seat 1 will now be described.

It is assumed that an impulse force exceeding a predetermined value is applied to a vehicle, by, e.g., a collision from behind and a signal is outputted from the acceleration sensor 23 to the ignition portion 19. When the gunpowder takes fire in the ignition portion 19 by this signal, the gas is instantaneously supplied from the gas generation portion 20 to the cylinder 18.

With a pressure of this gas, the piston 21 moves in the right direction in FIG. 2, and the piston rod 22 moves in a direction that it protrudes from the actuator main body 17. Then, the pin member 33 at the end portion of the piston rod 22 is pushed out in a direction X indicated by an arrow in FIG. 2. As a result, the link 30 moves up while swiveling in a direction Y in FIG. 2 with the pin member 31 being used as a supporting point.

When the link 30 moves up while swiveling, the cam member 28 also moves in the same direction as the link 30. The cam member 28 enters a gap between the upper section 6a and the upper portion 8a of the headrest support frame 8. Then, the upper portion 8a placed at the first position shown in FIG. 3A is pushed out toward the second position in a direction Z by the slope portion 28a of the cam member 28 as shown in FIG. 3B.

As a result, the headrest 9 moves forward to the second position with the pin member 10 at the center as indicated by an arrow S in FIG. 1. When the headrest 9 moves forward to the second position, the upper portion 8a is received by the stopper 14, and hence the headrest 9 stops at a position where the head of the occupant M is supported.

As shown in FIG. 3B, when the link 30 moves up to the final position while swiveling, the upper portion 8a received by the stopper 14 is pressed against the stoppers 14 by the flat portion 28b of the cam member 28. Therefore, the headrest support frame 8 is locked, and the headrest 9 is held at the second position. Since the headrest 9 is fixed at the second position in this manner, the head of the occupant M can be supported without being thrown to the rear side.

The actuator unit 16 is set on a lower surface of the upper frame 6 with which the back of the occupant does not come into contact. With this actuator unit 16, the headrest 9 can be moved to the second position where the head of the occupant M is supported. This actuator unit 16 is arranged in the vicinity of the headrest support frame 8 which should be driven. Therefore, the drive force generated by the small actuator unit 16 can be efficiently transmitted to the headrest support frame 8 with the simple structure.

Since the small actuator unit 16 is accommodated in the dead space at the upper part of the seat back 3, the actuator unit 16 cannot be a factor of the uncomfortable feeling when the occupant sits in, thereby assuring the excellent ride quality. Additionally, the actuator unit 16 directly drives the headrest support frame 8 in the vicinity thereof. Therefore, a delay in operation of the headrest 9 or a decrease in a movement quantity of the headrest 9 can be suppressed, thus assuring the stable and excellent mobility of the headrest 9.

The actuator unit 16 is attached to the lower part of the upper section 6a, and drives the center of the upper portion 8a of the headrest support frame 8. As a result, the headrest 9 moves forward while maintaining the stable posture by the drive force applied from the center of the upper portion 8a. Thus, the further stable and excellent mobility of the headrest 9 can be obtained.

The actuator unit 16 instantaneously moves the piston rod 22 by the gunpowder, and uses the piston rod 22 to move the cam member 28 to a gap between the upper section 6a and the upper portion 8a. The headrest support frame 8 moved to the second position by the actuator unit 16 is received by the stopper 14. Therefore, with the simple structure, the headrest 9 can be moved to the second position.

The upper portion 8a of the headrest support frame 8 is sandwiched and locked between the flat portion 28a of the cam member 28 and the stopper 14. Accordingly, the headrest 9 can be fixed to the second position by using the simple structure exploiting the stopper 14.

The upper portion 8a is thrusted forward by the slope portion 28a of the cam member 28, and then locked by the flat portion 28b of the cam member 28. Since this cam member 28 is provided to the wall 30a of the link 30 which swivels along the gap between the upper section 6a and the upper portion 8a, its structure is simple.

The headrest support frame 8 is urged toward the first position by the spring 34 and held at the first position. Therefore, the headrest 9 can be prevented from swinging or oscillating at the first position. This headrest support frame 8 is urged toward the first position by the spring 34, and moved toward the second position when thrusted by the cam member 28. Therefore, when a load is inputted to the headrest 9 from the rear side of the headrest 9, the headrest support frame 8 moves toward the stopper 14 irrespective of the actuator unit 16, and the load can be received by the stopper 14.

That is, when the load is inputted from the rear side of the headrest 9, the headrest support frame 8 swivels frontward with the pin member 10 being used as a supporting point, and then this load is received by the stopper 14. Therefore, the load can be prevented from being applied to the actuator unit 16. When the load from the rear side is eliminated, the headrest support frame 8 and the headrest 9 return to the original first position (standby position) by the elastic force of the spring 34. That is, they return to the state before the load is inputted.

The headrest support frame 8 is formed of a pipe member which is bent in an L shape along the side frame 7 of the main frame 5. This bent side portion 8b is supported on the side frame 7 by the pin member 10 so as to be capable of swiveling. Therefore, with the simple structure, the headrest support frame 8 can be swiveled.

Figure 4A:
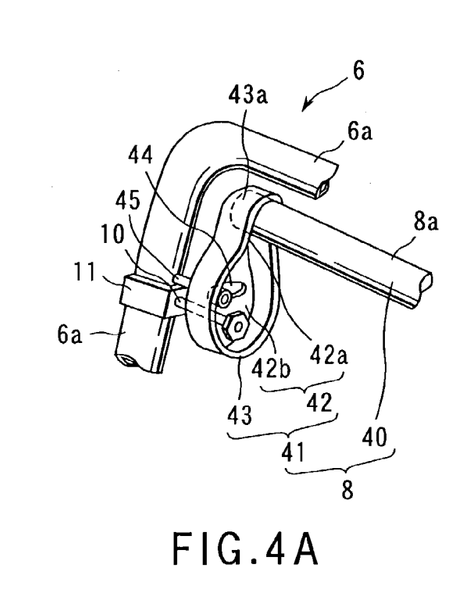
FIG. 4A is a perspective view showing a part of a vehicular seat according to a second embodiment of the present invention.
Figure 4B:
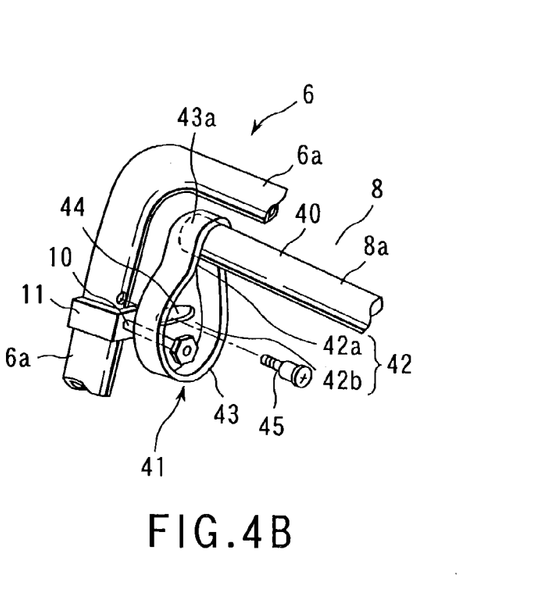
FIG. 4B is an exploded perspective view showing a part of the seat depicted in FIG. 4A.

FIGS. 4A and 4B show a second embodiment according to the present invention.

The headrest support frame 8 according to this embodiment is constituted into an inverse U shape by the upper portion 8a consisting of a pipe member 40 and brackets 41 as well as an inverse U shape obtained by bending the pipe member. The bracket 41 consists of a metal plate member. FIG. 4A shows a state that the headrest support frame 8 is assembled to the main frame 5.

This headrest support frame 8 is constituted by one linear pipe member 40 along the upper section 6a of the main frame 5, and a pair of brackets 41 (only one of a pair is illustrated in FIGS. 4A and 4B) which are attached on both ends of the pipe member 40 and consist of metal sheets. The bracket 41 is formed by processing a metal plate member by using a press or the like.

The bracket 41 has a plate portion 42 and a circumferential wall 43. A small-diameter first portion 42a is formed to a part of the plate portion 42 close to one end thereof. A large-diameter second portion 42b is formed to a part of the plate portion 42 close to the other end thereof. The circumferential wall 43 rises from the peripheral edge of the plate portion 42, and surrounds the plate portion 42. The respective brackets 41 are fixed to the both ends of the pipe member 40. Specifically, an end portion of the pipe member 40 is fitted to a concave portion surrounded by the first portion 42a and the circumferential wall 43, and they are fixed to each other by, e.g., welding.

By attaching a pair of the brackets 41 to the both ends of the pipe member 40 in this manner, there is constituted the inverse-U-shaped headrest support frame 8 that the brackets 41 protrude in a perpendicular direction of the pipe member 40. The second portion 42b of each bracket 41 is supported by the pin member so as to be capable of swiveling in the front-and-back direction like the first embodiment. The headrest support frame 8 can swivel with respect to the upper frame 6 with the pin member 10 at the center in the front-and-back direction.

Like the first embodiment, this headrest support frame 8 according to the second embodiment can move from the first position in the vicinity of the upper section 6a toward the second position. In this second embodiment, like reference numerals denote parts equal to those in the first embodiment, thereby eliminating their explanation.

The headrest support frame 8 according to the second embodiment can be readily manufactured as compared with one obtained by bending a pipe member in the first embodiment, since attaching the brackets 41 to the both ends of the pipe member 40 can suffice.

In order to set the headrest support frame 8 along the inverse-U-shaped upper frame 6, a radius of an angle portion between the upper portion 8a and the side portion 8b must be reduced. Like the second embodiment, the headrest support frame 8 obtained by attaching the brackets 41 to the pipe member 40 can reduce a radius of the angle portion as compare with one obtained by bending the pipe member, thereby decreasing the size.

The headrest support frame 8 using the brackets 41 has an advantage that the stopper mechanism can be readily obtained. The stopper mechanism is constituted by an arc slot 44 formed to the second portion 42b of the bracket 41 and a pin-like stopper member 45 inserted into the slot 44, as shown in FIG. 4B. The slot 44 extends in the front-and-back direction around the pin member 10. The stopper member 45 is fixed to the side section 6b of the upper frame 6. FIG. 4B shows a state that the stopper member 45 is removed from the side section 6b.

When the headrest support frame 8 moves from the first position toward the second position, the stopper member 45 relatively moves toward a rear end of the slot 44. When the headrest support frame 8 moves to the second position, the stopper member 45 abuts on the rear end of the slot 44, and the headrest support frame 8 thereby stop at the second position.

In these first and second embodiments, the headrest 9 is moved from the first position toward the second position by the drive force generated by the actuator unit 16 without suppressing a speed. Like an embodiment mentioned below, however, there may be comprised a deceleration mechanism 50 which absorbs a kinetic energy when the headrest 9 moves from the first position to the second position.

Figure 5A:
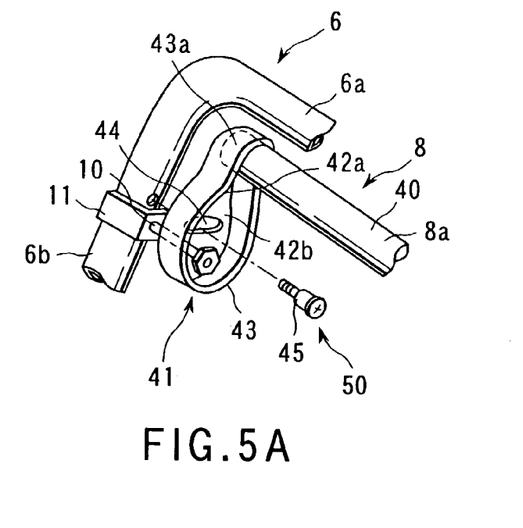
FIG. 5A is a perspective view showing a part of a main frame and a headrest support frame of a vehicular seat according to a third embodiment of the present invention.
Figure 5B:
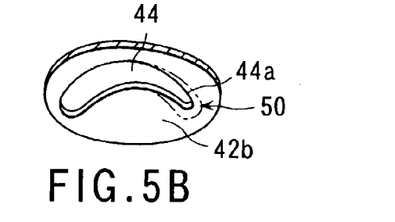
FIG. 5B is an enlarged perspective view showing a part of the headrest support frame of the seat depicted in FIG. 5A.

A third embodiment depicted in FIGS. 5A and 5B illustrates an example of the deceleration mechanism 50. In this third embodiment, the deceleration mechanism 50 is provided to the headrest support frame 8 having the bracket 41. This deceleration mechanism 50 is constituted by a slot 44 formed to the bracket 41 and a stopper member 45. This deceleration mechanism 50 decelerates the movement of the headrest 9 in the vicinity of the second position when the headrest 9 moves from the first position to the second position. Specifically, as shown in FIG. 5B, a width of a rear end 44a of the slot 44 used to stop the headrest 9 at the second position is set smaller than a width of any part other than the rear end 44a.

According to this structure, when the headrest support frame 8 moves forward to the vicinity of the second position, the stopper member 45 meshes with a peripheral edge portion in the vicinity of the rear end 44a of the slot 44. Therefore, the kinetic energy of the headrest 9 is absorbed, and a moving speed of the headrest 9 is lowered. Consequently, when the headrest 9 reaches the second position, the headrest 9 can be suppressed from being subjected to an over-stroke beyond the second position by the inertia force. Therefore, it is possible to prevent a behavior of the headrest 9 such as that it hits the head of the occupant M. Further, there is an advantage that the load is not suddenly applied to the rear end 44a of the stopper member 45. It is to be noted that the deceleration mechanism 50 may be constituted by a slot and a pin member which are formed separately from the slot 44 and the stopper member 45.

Figure 6:
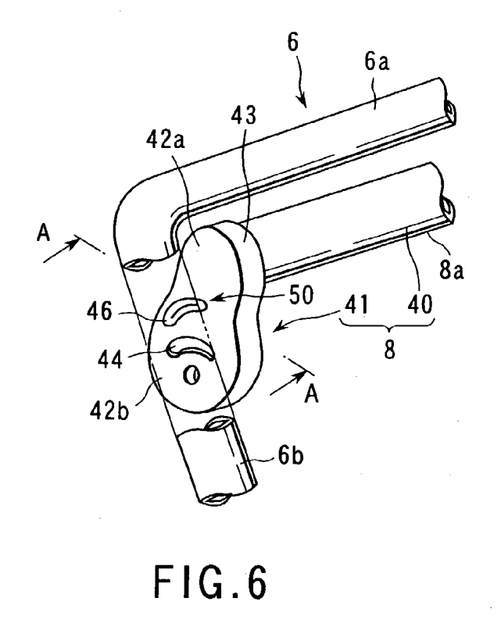
FIG. 6 is a perspective view showing a part of a vehicular seat according to a fourth embodiment of the present invention.
Figure 7:
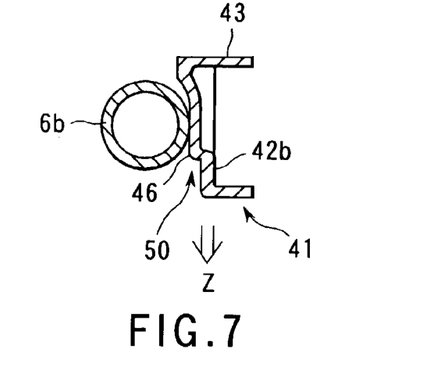
FIG. 7 is a cross-sectional view of the seat taken along the line A—A in FIG. 6.

A deceleration mechanism 50 according to a fourth embodiment shown in FIGS. 6 and 7 is constituted by a convex portion 46 as typified by a bead or an emboss formed to the bracket 41, and the side section 6b of the main frame 5. The convex portion 46 protrudes from an outer surface (surface opposed to the side section 6b) of the bracket 41 toward the side section 6b.

As shown in FIG. 6, the convex portion 46 is formed into an arc shape around the pin member 10. This convex portion 46 is formed so as to be in friction with the side section 6b of the main frame 5 when the headrest support frame 8 nearly reaches the second position. That is, when the headrest support frame 8 moves toward the second position, the convex portion 46 is in friction with the side section 6b of the main frame 5 in the vicinity of the second position as shown in FIG. 7. As a result, the kinetic energy of the headrest support frame 8 is absorbed, thereby lowering an operation speed of the headrest support frame 8.

Like the third embodiment, the fourth embodiment having such a structure can suppress the over-stroke of the headrest 9 beyond the second position. In this fourth embodiment, parts corresponding to those in the first to third embodiments are denoted by reference numerals equal to those in the first to third embodiments, thereby eliminating their explanation.

Figure 8:
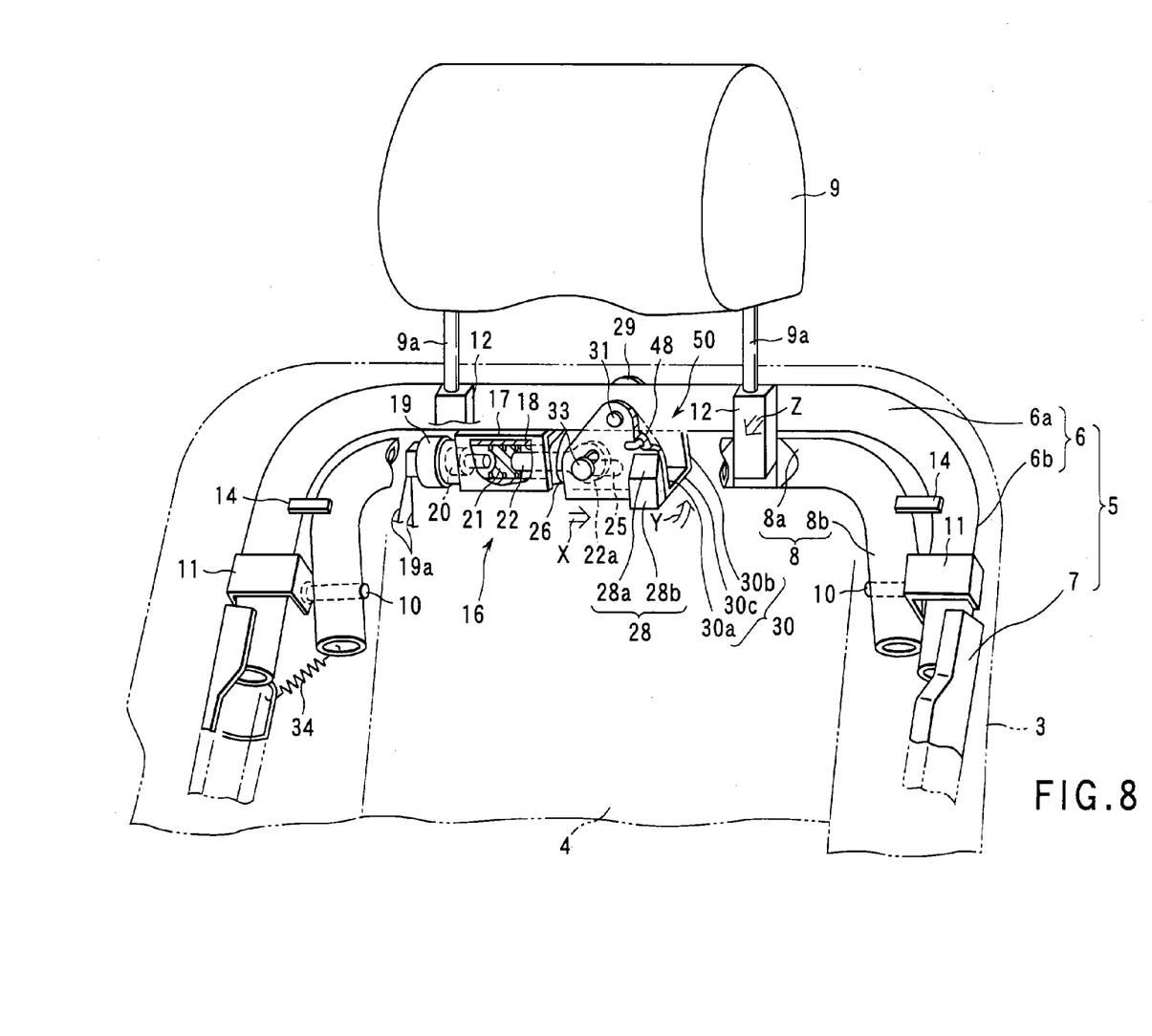
FIG. 8 is a perspective view showing an upper part of a vehicular seat according to a fifth embodiment of the present invention.
Figure 9:
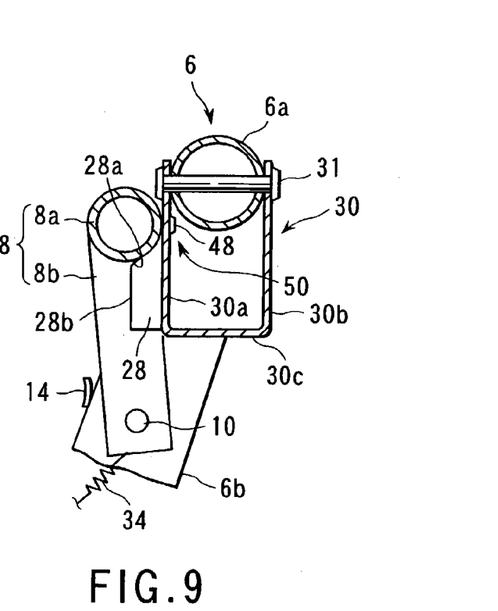
FIG. 9 is a vertical cross-sectional view showing a part of the seat illustrated in FIG. 8.

A deceleration mechanism 50 according to a fifth embodiment shown in FIGS. 8 and 9 includes a convex portion 48 formed to the actuator unit 16. This convex portion 48 protrudes from an inner surface (surface opposed to the upper section 6a) of the front wall 30a of the link 30 toward the upper section 6a.

The convex portion 48 is formed into a circular shape around the pin member 33. This convex portion 48 is formed so as to be in friction with the upper section 6a in the vicinity of a final position when the link 30 swivels by the actuator unit 16. That is, when the link 30 moves up while swiveling, the convex portion 48 is in friction with the upper section 6a in the vicinity of the final position as shown in FIG. 9. As a result, the kinetic energy given to the headrest support frame 8 by the actuator unit 16 is lowered, and a moving speed of the headrest support frame 8 is decreased in the vicinity of the second position.

Like the fourth embodiment, the fifth embodiment configured in this manner can suppress the over-stroke of the headrest 9 beyond the second position. It is to be noted that, in the fifth embodiment, like reference numerals denote parts equal to those in the first embodiment, thereby eliminating their explanation.

The present invention is not restricted to each of the foregoing embodiments, and it can be modified in many ways without departing from the scope of the invention. For example, in the foregoing embodiments, although the gunpowder type actuator unit which obtains the drive force by burning the gunpowder is used, the present invention is not restricted thereto, and any structure of the actuator unit may be adopted. For instance, it is possible to employ an actuator which suddenly moves the piston by using a fluid such as an oil or an actuator which suddenly moves the piston by driving of the motor.

Furthermore, in each of the foregoing embodiments, although the headrest support frame which swivels in the front-and-back direction of the main frame is adopted in order to simplify the structure, it is possible to adopt a structure that the headrest support frame moves in parallel. In brief, it is good enough that the headrest support frame can move from the first position to the second position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A vehicular seat having a forward movable headrest, comprising:
    a main frame which is provided to a seat back which supports a back of an occupant who sits in the back seat, the main frame including an upper frame which is positioned at an upper part of the seat back and extends in a widthwise direction of the seat back, and a pair of side frames which extend downward from both ends of the upper frame;
    a headrest support frame which is arranged at an upper part of the main frame and can move from a first position in the vicinity of the upper frame to a second position close to the occupant;
    a headrest which is attached to the headrest support frame and opposed to a head of the occupant; and
    an actuator unit which is attached along the upper frame, generates a drive force when an impulse force equal to or above a predetermined value is applied to a vehicle, and moves the headrest support frame in a direction along which it approaches the occupant by transmitting the drive force to the headrest support frame;
    wherein the actuator unit is arranged at a lower part of an intermediate portion of the upper frame in a widthwise direction in such a manner that its drive force can be applied to a substantially central part of the headrest support frame in the widthwise direction.

2. The vehicular seat according to claim 1, further comprising a return spring which urges the headrest support frame toward the first position.

3. The vehicular seat according to claim 1, wherein the headrest support frame comprises:
    an upper portion which is arranged along the upper frame and extends in a horizontal direction; and
    a pair of side portions which extend downward from both ends of the upper portion along the side frame and are supported to the side frame so as to be capable of swiveling in a front-and-back direction.

4. The vehicular seat according to claim 1, wherein the headrest support frame comprises:
    an upper portion which is arranged along the upper frame and extends in a horizontal direction; and
    a pair of brackets which extend downward from both ends of the upper portion along the side frame and each of which consists of a plate member supported to the side frame so as to be capable of swiveling in a front-and-back direction.

5. The vehicular seat according to claim 4, further comprising a deceleration mechanism which decelerates a moving speed when the headrest support frame moves from the first position toward the second position,
    wherein the deceleration mechanism includes a convex portion which is formed to the bracket and is in friction with the upper frame when the link swivels.

6. The vehicular seat according to claim 4, further comprising a deceleration mechanism which decelerates a moving speed when the headrest support frame moves from the first position toward the second position,
    wherein the deceleration mechanism includes: a slot which is formed to the bracket and has a rear end with a narrow width; and a stopper member which is fixed to the upper frame and inserted into the slot, the stopper member meshing with the rear end of the slot when the link swivels.

7. The vehicular seat according to claim 1, further comprising a deceleration mechanism which decelerates a moving speed when the headrest support frame moves from the first position toward the second position.

8. A vehicular seat having a forward movable headrest, comprising:
    a main frame which is provided to a seat back which supports a back of an occupant who sits in the back seat, the main frame including an upper frame which is positioned at an upper part of the seat back and extends in a widthwise direction of the seat back, and a pair of side frames which extend downward from both ends of the upper frame;
    a headrest support frame which is arranged at an upper part of the main frame and can move from a first position in the vicinity of the upper frame to a second position close to the occupant, the headrest support frame having an upper portion which is arranged in substantially parallel with the upper frame on a front side of the upper frame;

a headrest which is attached to the headrest support frame and opposed to a head of the occupant;

an actuator unit comprising:
　a piston which moves in a direction along the upper frame;
　a cam member which can enter a gap between the upper frame and the upper portion of the headrest support frame;
　a transmission mechanism which transmits movement of the piston to the cam member, and thrusts the headrest support frame toward the second position by causing the cam member to enter the gap between the upper frame and the upper portion of the headrest support frame; and a stopper which is provided to the main frame and receives the headrest support frame when the headrest support frame moves to the second position, wherein the actuator unit which is attached along the upper frame, generates a drive force when an impulse force equal to or above a predetermined value is applied to a vehicle, and moves the headrest support frame in a direction along which it approaches the occupant by transmitting the drive force to the headrest support frame.

9. The vehicular seat according to claim 8, wherein the cam member comprises:
　a slope portion which thrusts the headrest support frame toward the second position in process of entering of the cam member into the gap between the upper frame and the upper portion of the headrest support frame; and
　a flat portion which holds the headrest support frame between itself and the stopper upon completion of entering of the earn member into the gap between the upper frame and the upper portion of the headrest support frame.

10. The vehicular seat according to claim 8, wherein the transmission mechanism includes:
　a link which is supported by the upper frame so as to be capable of swiveling and has a wail which moves along the gap between the upper frame and the headrest support frame by the piston, and the cam member provided to the wall.

11. The vehicular seat according to claim 10, further comprising a deceleration mechanism which decelerates a moving speed when the headrest support frame moves from the first position toward the second position,
　wherein the deceleration mechanism includes a convex portion provided to the link which is in friction with the upper frame when the link swivels.

* * * * *